May 15, 1945.   K. T. KÄLLE   2,376,149
GAS GENERATOR CHARGED WITH SOLID COMBUSTIBLE FUEL
Filed May 26, 1941
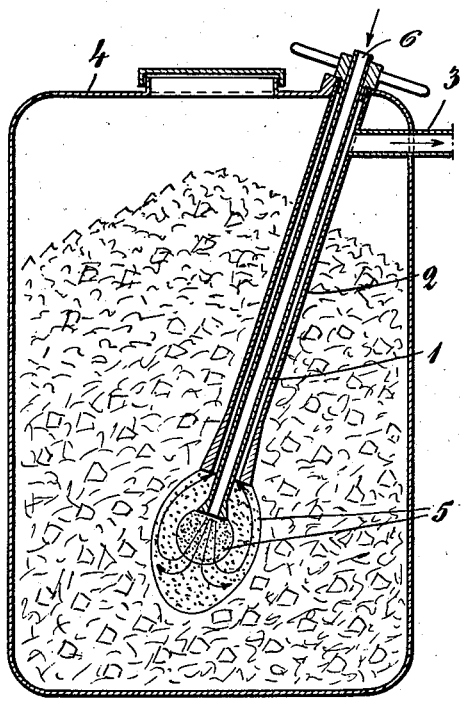
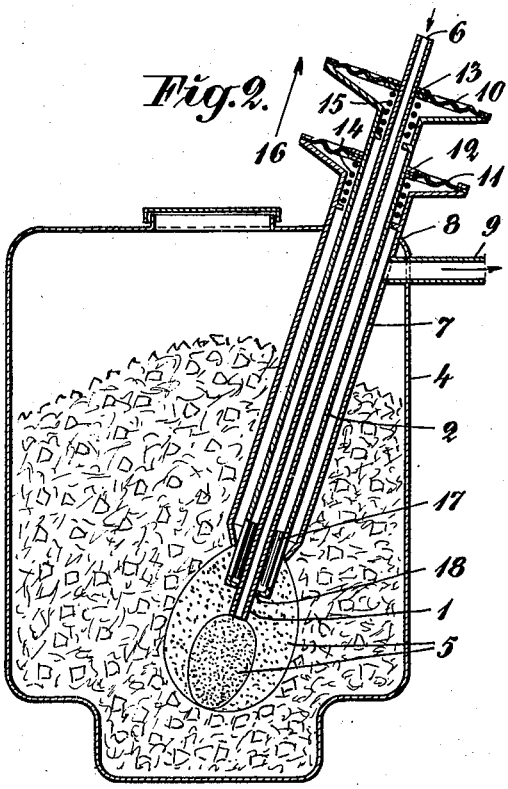
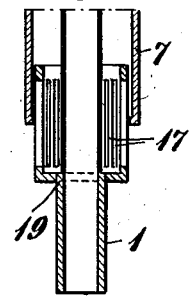
Inventor:
Karl Torsten Källe
By Thomas H. West
Attorney Patented May 15, 1945

2,376,149

UNITED STATES PATENT OFFICE 2,376,149

GAS GENERATOR CHARGED WITH SOLID COMBUSTIBLE FUEL

Karl Torsten Källe, Saffle, Sweden

Application May 26, 1941, Serial No. 395,241
In Sweden November 18, 1940

9 Claims. (Cl. 48—118.5)

In charcoal- or wood-charged fuel gas generators of the types hitherto generally employed and based on the reversed draught principle, the generated gas is conducted through the layer of charcoal or charcoal dust, i. e., the half burned or broken up pieces of charcoal lying underneath the combustion zone. The disadvantage is hereby involved that this layer of charcoal dust is rendered denser and denser, so that in a comparatively short time it becomes impermeable to the gas. It is therefore repeatedly necessary to shut down the generator operation in order to remove the slag from this agglomerated layer which then is replaced by larger pieces of fresh charcoal coming from the layers situated thereabove.

In order to eliminate to a certain extent the disadvantage of these frequently recurring and time-wasting de-slagging operations it has been sought in the case of charcoal charged generators to employ comparatively large pieces of charcoal of uniform size and previously cleaned free from dust and small particles whilst having as high a strength as possible, so that the possibility has been realised to a certain extent of avoiding the dust formation in the generator.

Procuring charcoal of this kind, however, turns out pretty expensive, inasmuch as it stipulates the fulfilment of certain stringent requirements with regard to the quality of the raw material and its cabonisation, which may mean that it possibly cannot be supplied in adequate quantities. It has, moreover, been found particularly difficult to obtain such high quality charcoal from coniferous wood.

Another disadvantage encountered with known types of gas generators consists in the fact that the position of the twyer or pipe for the injection of primary air is constant in relation to the commonly occurring double conical constriction of the fire room and through which double cone the gases are forced downwards. The mouth of the air injecting means is then generally so situated that upon operating the generator to the full extent of its working capacity the oxidation zone will start to shift down in the direction towards the mouth of the cone with the result that the reduction zone then occupies the whole of the cone. It is at this juncture that the generator is functioning at its best. On fairly low or very low loads, say for example when in automobile engine supplied by the generator is idling, the oxidation zone due to the small quantity of injected air supply will shift further upwards to a considerable extent with the result that the reduction zone due to its reduced compass can even shift out of the cone altogether. In that event the risk is encountered that products of dry distillation from the layer of charcoal lying thereabove will together with liberated water vapor due to the inherent moisture content of these charcoal layers be enabled to dodge past the reduction zone, as it were, without entering into contact with the red hot charcoal.

It is now the purpose of the present invention to eliminate the disadvantages above referred to principally by the provision of a novel arrangement for the removal of the generated gas from the gas generator and introducing combustion air thereinto. More specifically the invention relates to the combination in a gas generator designed for engine propulsion and to be charged with solid combustible fuel, of gas discharging means comprising at least one gas outlet pipe for the generated gas inserted in the fuel with combustion air injecting means comprising at least one air intake pipe inserted in the fuel charge, the mouths of said pipes being positioned in relation to one another in a manner such as upon operation of the generator to cooperate to limit the extent of the reaction zones.

It has turned out that with an arrangement working on this principle the possibility is afforded of providing an advantageous mutual disposition and limited extent of the oxidation and reduction zones respectively whilst at the same time achieving by simple means a favourable adaptability or response on the part of the generator to the load.

By the disposition of a special discharge pipe (or a plurality of such pipes) inserted into the wood or charcoal charge respectively the advantage is further achieved that the conducting of gas from out of the receptacle is rendered independent of the density of packing of the more or less incinerated layers of charcoal underneath which the gas in the case of the earlier types of generators referred to above has to pass. This in its turn brings with it less dependence of the quality of the fuel.

According to a preferred embodiment of the invention the gas discharge pipe or pipes respectively are arranged concentrically around the air injecting pipe or pipes respectively, whereby the two pipes form a unit or by pairs form units capable of being easily assembled. The air injecting pipe or pipes respectively, movable in relation to the gas discharge pipe and to be employed at the same time as a cleaning device for the removal of possible impurities such as charcoal particles tending to choke up the opening of the gas discharge pipe.

In combination with the gas discharge pipe (or pipes respectively) at its end opening out into the mass of charcoal or wood inlet openings can be formed which are so adapted as to permit the passage of gas, but to obstruct the entry of the charcoal particles into the gas discharge pipe. The said openings are preferably made so fine that at this point charcoal dust and other impurities are already removed to a considerable extent from the gas. The said inlet openings can present the form of slits in the wall of the gas discharge pipe, whereby a grating is thus formed and in this case the gas outlet pipe is preferably arranged to be movable in an outer fixed pipe serving as a guide therefor and presenting scraping means co-operating with the said grating. Alternatively the inlet openings can be constituted by slits of the kind described formed in the wall of a relatively small fixed pipe piece connected to the air injecting pipe at the lower end thereof and also forming a grating which concentrically and with some intermediate play surrounds the said pipe and enters the lower end of the gas discharge pipe, which in this case may be fixed. In both these cases the grating can appropriately be be kept moving during operation of the generator so that charcoal dust, carbon particles etc. easily are removed at the slits.

This grating device according to the invention renders it possible to employ charcoal containing a comparatively large quantity of dust and small particles, whilst affording the facility of thereby attaining a higher temperature in the oxidation zone. The further advantage is moreover attained that the generator can be ignited from the cold state the more rapidly, the finer the charcoal happens to be.

In order to achieve an advantageous adaptability and response to varying operating conditions and also effect movement of the grating, the air injecting pipe and possibly also the gas discharge pipe (that is to say in the case when the grating is formed therein) can be made automatically movable during the generator operation in such a manner that the possibility is afforded of the oxidation and reduction zones respectively becoming increased or reduced in extent according to the fluctuating gas demand. By means of this arrangement it is also made possible to satisfy the condition that the inlet openings, i. e., the grating slits for the gas discharge pipe will always be located in the region of the reduction zone so that the gas will be forced in its entirety to pass through this zone before proceeding further.

The automatic movement of the air injecting pipe and also of the gas discharge pipe can according to the invention be obtained by the variable vacuum in the gas discharge pipe varying with the fluctuating gas consumption, whereby this vacuum is enabled for example to act on a bellows or diaphragm device fixed to the air injecting pipe or the gas discharge pipe respectively.

Further features of the invention will be evident from the following description of three embodiments of the device for gas generators respectively, represented in the accompanying drawings by way of example:

Figure 1 represents the first of these embodiments, and Fig. 2 the second whilst Figs. 3 and 4 show on a somewhat larger scale the lower end of the gas discharge pipe with the grating according to Fig. 2 in cross-sectional elevation and horizontal section respectively. Fig. 5 represents in a manner similar to that according to Fig. 3 the third embodiment.

Referring to Fig. 1 a pipe or twyer 1 for the injection of primary air is arranged in the fuel receptacle 4 charged with solid combustible fuel, such as charcoal or wood, the said air entering at the upper end 6 of the twyer. A discharge pipe 2 opens out at or in the vicinity of the oxidation and reduction zones 5 and the generated gas is conducted away from the receptacle therethrough. In the case represented this discharge pipe 2 is arranged concentrically around the air injecting pipe 1, the end of which extends a little beyond the end of the pipe 2. The generated gas is thus conducted between the two pipes 1 and 2 and departs through an outlet pipe 3 branching out from the pipe 2. The distance between the respective lower ends of the pipes 1 and 2 is adaptable according to the relative situation and the extent of the reduction and oxidising zones respectively. The air injecting pipe 1 can according to the invention be arranged to be movable relatively to the discharge pipe 2, so that it can be shifted up and down and thus also serve as a cleansing device in the event of charcoal particles or other impurities choking up the lower end of the discharge pipe 2. To this end the injection pipe 1 is appropriately provided with a handle at its outer end.

It will be seen with reference to Fig. 2 that the injecting pipe 1 and the gas discharge pipe 2 are likewise relatively movable in their longitudinal direction and are located in a surrounding pipe 7 fixed at 8 to the receptacle 4 and serving as a means for guiding the inner pipes. The generated gas is taken off through a pipe 9 branching from the surrounding pipe 7.

At the lower end the gas discharge pipe 2 is provided with a grating 17 formed by slits in the wall, see Figs. 3 and 4, through which the generated gas is introduced. At its lower end the outer pipe 7 surrounds the grating 17 so that a larger or smaller part of the grating opening will be exposed. The injecting pipe 1 is passing the bottom of the grating pipe 2 through an opening 18 and thereby a guidance for the same is obtained.

The slits of the grating 17 through which the gas is sucked into the pipes 2 and 7 from the reduction zone formed by the surrounding layer of charcoal are relatively narrow, varying from 0.1–3 millimetres according to the different design and purpose involved, and it is of course desirable that the slits shall be as fine as possible. The said slits serve namely as filters for charcoal dust, through which only the finest particles are allowed to penetrate into the grating pipe 2 so as then to pass through the pipe 9. In this way the gas undergoes preliminary cleaning to a considerable extent.

Bellows or diaphragms indicated by 10 and 11 are fixed to the grating pipe 2 and the injecting pipe 1 at points 12 and 13 thereon respectively. 14 and 15 refer to spiral springs which tend to become elongated and thereby exercise a displacing action on the air injecting pipe 1 and the grating pipe 2 respectively in the direction of the arrow 16.

The mode of operation of the above-described arrangement is as follows:

When gas is sucked out through the pipe 9 for example by an automobile engine connected to the gas generator, flow resistance is set up to a certain extent in the pipe 2 itself and the injecting pipe 1 respectively, whereby a certain amount of vacuum is created at the diaphragms 10 and 11. The pressure effect thus exercised on the diaphragms can be counterbalanced by the action of the spiral springs 14 and 15. It will be evident that the greater is the suction set up in the pipe 9, in other words, the more rapidly the engine is running, the greater will be the quantity of gas required thereby and correspondingly increased will be the extent of the vacuum effect exercised on the diaphragms which vacuum is practically speaking equal to the amount of vacuum created in the actual generator receptacle 4.

When the vacuum increases the grating pipe 2 will be pushed further down into the charcoal layer in the generator. This means not only that a larger portion of the grating will be left exposed, so that a larger quantity of gas is enabled to flow all the more easily into the pipe 2, but also that the injecting pipe 1 is pressed further down, that is to say to such an extent that the distance from its end opening to the grating is made larger.

The purpose of this is that with the larger quantity of air which can be introduced and with the larger quantity of gas respectively, which can depart through the enlarged grating opening, the oxidation and the reduction zones respectively will thus be caused to increase in size, which increase is effected by the automatic prolongation of the injecting pipe 1. The zones in question are represented in Fig. 1 by the reference 5.

Due to the fact that the injecting pipe 1 is movable the freely extending end of the grating pipe 2 can for different rates of air-flow always be kept red-hot at round about 800° C. This means that all particles which do not enter through the grating 17 will be oxidised or broken up until their size is such that they can force their way through the said grating. This is the essential reason why it is possible to employ such fine slits in the grating without the risk of their immediately becoming choked up on that account.

The upward and downward displacement of the grating pipe 2 also constitutes an assurance that charcoal particles possibly fixed to the grating will be removed, so that the grating is constantly kept automatically clean and open.

Since in the case represented the oxidation zone is situated, as it were, underneath the reduction zone, i. e. contrary to what is usually the case, dust formation can never take place, nor can agglomerates of clogged ordinary and charcoal dust accumulate in the actual reduction zone because the downwardly falling and scraped off charcoal particles always have to pass the reduction zone before entering the oxidising zone and there becoming burned up. It is evident that in this way scraping out of slag, such as is necessary in the case of ordinary gas generators of known type is in the present instance superfluous, inasmuch as practically everything is effectively burned up.

Due to the fact that the grating 17 is displaceable relatively to the surrounding pipe 7, the reduction zone will always completely cover the supply inlet for the generated gas in the grating, so that moisture vapors or products of dry distillation from the layer of charcoal above cannot depart through the grating without first passing through the reduction zone and possibly the oxidising zone respectively. This consideration is, above all, of great importance in those cases where the charcoal is mixed with water or it contains pieces of uncarbonized wood.

The embodiment according to Fig. 5 can be said to constitute a combination of the two embodiments just described. All that is retained in this case of the pipe 2 according to Figs. 2-4, is the lower end piece provided with the grating openings 17 and this end piece at the point 19 is fixed to the injecting pipe 1 and thus participates in the movement thereof. Between the fixed pipe 7, which in this case accordingly serves as the sole gas discharge pipe, and the injecting pipe 1 a diaphragm acted upon by the vacuum in the pipe 7 and effecting automatic movement of the pipe 1 may be interposed analogously to the case represented in Fig. 2.

It will of course be appreciated that the method hereinbefore described of effecting the automatic movement of the injecting pipe and the gas discharge pipe respectively, whilst employing the varying suction effect in the outlet pipe from the generator or the variation in the vacuum produced thereby, can be designed to take place in a manner other than that here represented.

In the event of the generator being employed in association with an automobile engine for example, it is possible to utilise the varying vacuum occurring between the carburettor throttle and the engine proper to effect the desired movement of air injecting pipe 1 and gas discharge pipe 2 respectively, which vacuum bears a certain relationship to the engine speed and the quantity of gas sucked in respectively.

In the embodiment according to Figs. 2-4, wherein both pipes are represented as being movable, the automatic displacement of the injecting pipe or pipes respectively can be effected by the vacuum fluctuations in the generator fuel receptacle and the displacement of the gas discharge pipe or pipes respectively by the vacuum occurring between the carburettor throttle and the engine proper, or vice-versa.

I claim:

1. In a gas generator designed for engine propulsion and comprising a receptacle for solid combustible fuel, the combination of an assembly of means extending downwardly into said receptacle and fixed thereto, comprising at least one outlet discharge pipe for the generated gas, and means comprising at least one inlet pipe surrounded by the outlet discharge pipe, the lower end of the inlet pipe projecting further into the receptacle than the lower end of the gas discharge pipe.

2. In a gas generator of the kind claimed in claim 1, the inlet pipe and discharge pipe being relatively movable axially whereby the distance between their lower ends may be adjusted and the inlet pipe may be employed to prevent choking of the lower end of the discharge pipe.

3. A gas generator as claimed in claim 1 in which the lower end of the discharge pipe is completely sealed and the wall of the discharge pipe at its lower end portion is provided with intake openings of a fineness permeable to the gas generated, but obstructing the entry of charcoal particles and the like.

4. A gas generator as claimed in claim 1 in which the gas discharge pipe has its lower end completely sealed and said pipe is provided near its lower end with peripherally disposed slits forming a grating, and auxiliary guiding and scraping means cooperating with said grating to free the latter from clogging charcoal deposits and the like.

5. In a gas generator designed for engine propulsion and comprising a receptacle for solid combustible fuel, the combination of an outer gas discharge pipe extending downwardly into said receptacle and fixed thereto, a movably mounted inlet pipe surrounded and guided by said gas discharge pipe, said inlet pipe also extending into the receptacle beyond the lower end of the gas discharge pipe and provided at its lower end portion with a peripherally disposed gas filter grating which is fixed thereto and arranged above its lower end, said grating being movable in sliding relation with the end of the gas discharge pipe.

6. In a gas generator designed for engine propulsion and provided with a receptacle for solid combustible fuel, the combination of an outer tube extending downwardly into the receptacle and fixed thereto, an axially movable outlet pipe for the generated gas surrounded and guided by said outer tube, and a movable inlet pipe surrounded by said outlet discharge pipe, the lower end of the inlet pipe projecting further into the receptacle than the lower end of the gas discharge pipe, the latter being provided with peripherally disposed slits forming a grating arranged to move in substantially sliding relation with the end of the guiding tube so as to be scraped free of clogging charcoal dust, carbon particles, and like deposits.

7. A gas generator as claimed in claim 6 including means responsive to the pressure existing in the receptacle for moving the gas discharge pipe relatively to the tube to effect such scraping.

8. A gas generator as claimed in claim 6 including means responsive to pressure within the receptacle for moving the inlet pipe relatively to the outlet pipe, and for moving the outlet pipe axially relatively to the outer tube.

9. In a gas generator designed for engine propulsion and comprising a receptacle for solid combustible fuel, the combination of an outer gas discharge pipe extending downwardly into said receptacle and fixed thereto, and a movably mounted inlet pipe surrounded and guided by said gas discharge pipe, said inlet pipe also extending into the receptacle beyond the gas discharge pipe and provided at its lower end portion with a peripherally disposed gas filter grating which is fixed thereto and arranged above its lower end to move in substantially sliding relation with the lower end of the gas discharge pipe, and means for causing axial movement of the inlet pipe dependent on a pressure fluctuating within the receptacle, said means comprising a diaphragm secured to the inlet and discharge pipe.

KARL TORSTEN KÄLLE.